United States Patent [19]

Berend et al.

[11] Patent Number: 5,754,183

[45] Date of Patent: May 19, 1998

[54] IMAGE PROCESSING APPARATUS AND METHOD FOR PRODUCING PIXEL DATA IN DEPENDENCE UPON THE SHAPE OF A SECTIONAL LINE EXTENDING BETWEEN BOUNDARY LINES OF AN OBJECT

[75] Inventors: Andrew Louis Charles Berend, Cambridge; Mark Jonathan Williams, Huntingdom, Cambs; Michael John Brocklehurst, Cambridge, all of Great Britain

[73] Assignee: Cambridge Animation Systems Limited, Great Britain

[21] Appl. No.: 643,322

[22] Filed: May 6, 1996

Related U.S. Application Data

[62] Division of Ser. No. 150,100, Jan. 24, 1994, Pat. No. 5,598,182.

[30] Foreign Application Priority Data

| May 21, 1991 | [GB] | United Kingdom | 9110945 |
| Aug. 12, 1991 | [GB] | United Kingdom | 9117409 |
| Nov. 29, 1991 | [WO] | WIPO | PCT/GB91/02122 |
| Nov. 29, 1991 | [WO] | WIPO | PCT/GB91/02124 |
| May 21, 1992 | [WO] | WIPO | PCT/GB92/00928 |

[51] Int. Cl.[6] ........................... G06T 17/00
[52] U.S. Cl. .......................... 345/429
[58] Field of Search ............ 395/129, 119, 395/142, 120, 123, 124; 345/122, 142, 157

[56] References Cited

U.S. PATENT DOCUMENTS

| 4,189,743 | 2/1980 | Schure et al. | 345/122 |
| 4,858,150 | 8/1989 | Aizawa et al. | 395/120 |
| 4,897,638 | 1/1990 | Kokunishi et al. | 345/142 |
| 5,155,805 | 10/1992 | Sampo Kaasila | 395/169 |
| 5,222,207 | 6/1993 | Yamada | 395/142 |
| 5,227,770 | 7/1993 | Freeman | 345/157 |

FOREIGN PATENT DOCUMENTS

| 0156117 | 10/1985 | European Pat. Off. . |
| 0194442 | 9/1986 | European Pat. Off. . |
| 0453044 | 10/1991 | European Pat. Off. . |
| 3821322 | 6/1988 | Germany . |
| 2089625 | 6/1982 | United Kingdom . |
| 84/02993 | 8/1984 | WIPO . |

OTHER PUBLICATIONS

"Hairy Brushes," Strassman, 1986 Siggraph Conference Proceedings (vol. 20, No. 4, pp. 225–232).

Yang et al., "Automatic Curve Fitting with Quadratic B–Spline Functions and Its Applications to Computer–Assisted Animation," Computer Vision, Graphics and Image Processing 33 (1986) pp. 346–363.

Burtnyk and Wein, "Interactive Skeleton Techniques for Enhancing Motion Dynamics in Key–Frame Animation, "Communications of the Assoc. for Computing Machinery, vol. 19, No. 10, Oct. 1976, pp. 564–569.

*Primary Examiner*—Phu K. Nguyen
*Assistant Examiner*—Cliff N. Vo
*Attorney, Agent, or Firm*—Lerner, David, Littenberg, Krumholz & Mentlik

[57] ABSTRACT

An image processing apparatus for generating visible output images, including visually distinct images. A processor generates displayable image data by writing data to a frame store which is repeatedly read therefrom. An input, preferably in the form of a mouse, supplies operator defined input signals to the processor for defining boundary lines (B1, B2) of an object and a sectional line (51), which identifies two boundary lines as defining the object. In addition, a data store is provided for storing data generated in response to the input signals and for storing attribute data defining visual attributes of the objects.

22 Claims, 14 Drawing Sheets

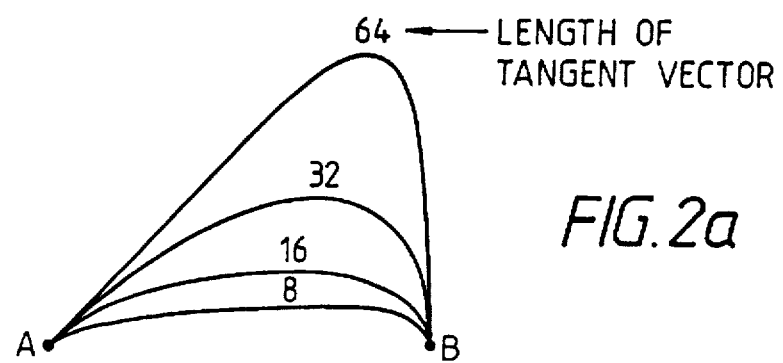
FIG.2a
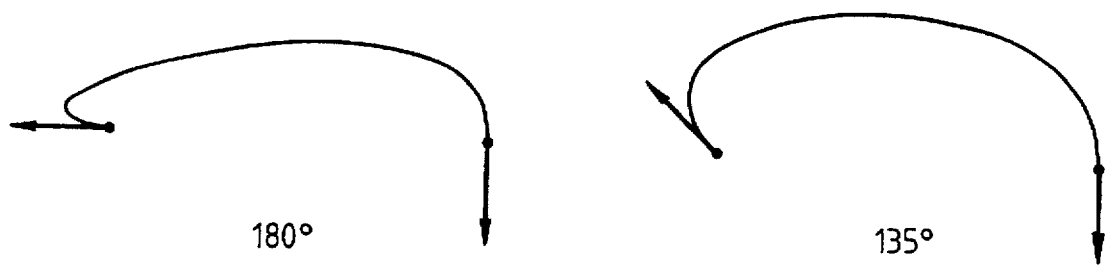
FIG.2b
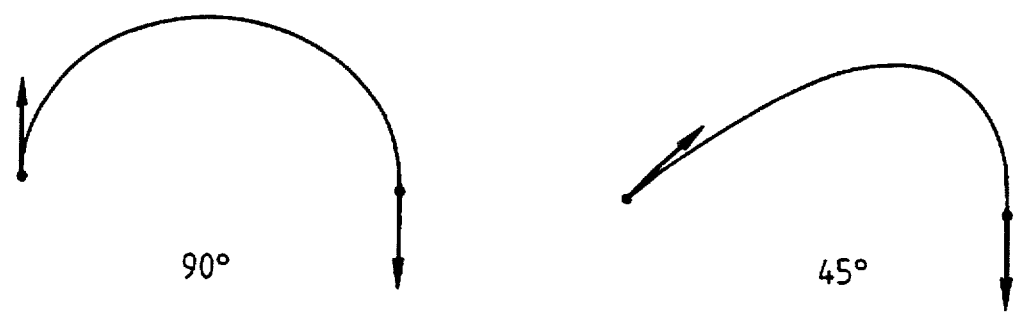
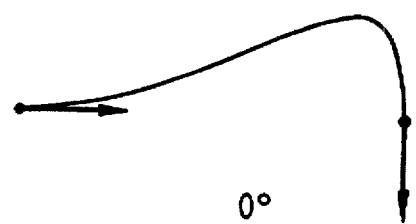

IMAGE PROCESSING APPARATUS AND METHOD FOR PRODUCING PIXEL DATA IN DEPENDENCE UPON THE SHAPE OF A SECTIONAL LINE EXTENDING BETWEEN BOUNDARY LINES OF AN OBJECT

This is a divisional of application Ser. No. 08/150,100 filed Jan. 24, 1994, now U.S. Pat. No. 5,598,182.

FIELD OF THE INVENTION

This invention relates to an image processing apparatus for generating visible output images, including visually distinct objects. This invention also relates to a method of generating visible output images, including visually distinct objects.

Image processing methods and apparatus are disclosed in copending U.S. application Ser. Nos. 07/844,634, 08/311, 398 (which is a continuation of Ser. No. 07/800,227) and Ser. No. 08/142,417 assigned to the present Assignee and are included herein as part of the present disclosure.

DESCRIPTION OF BACKGROUND ART

Traditional tools available to graphic artists include pencils and pens (generally producing substantially uniform lines) and brushes or airbrushes, producing a controllably non-uniform line, variable by varying the pressure and/or speed applied to the tool.

In addition to being represented in traditional form, images may now be represented in electronic form, in which the image is displayed on a cathode ray tube device or similar apparatus.

The cathode ray itself may be manipulated in response to vectors which trace the outline of an object, producing images which may be referred to as skeletons or wire frames. Vector systems of this type have advantages in that they are memory efficient and may generate image data at a definition which is independent of the definition of the display device. Alternatively, images may be produced on a cathode ray tube by raster scanning techniques, in which the whole of the screen is scanned periodically and the intensity of the cathode ray is modified in response to image data. Raster scanning in this way is employed in televsision systems and raster scan monitors are readily available.

An advantage of the raster scanning approach is that pixel values may be stored in a frame store representing not only the outline of the image but also the overall colour and texture of the image. Thus, very realistic images may be produced and the amount of storage required to store an image is not dependent upon the level of detail within the image itself. Images stored in framestores in forms compatible with television standards are attractive to the video industry and allow artists to generate graphics for use in television programs. Systems of this type are disclosed in British patent 2059625 which relates to machines manufactured and sold by Quantel Limited under the trade mark "PAINTBOX". The art of manipulating pixel values within a framestore is commonly referred to as "video graphics".

With a video graphics system, an operator selects the characteristics of the graphics tool he wishes to imitate and then manipulates a pressure sensitive stylus over a digitising pad to input a desired line. As the stylus is moved over the tablet, the apparatus senses the stylus position and the pressure applied thereto, reads image data from a corresponding mapped area of an image store (e.g. a frame buffer) modifies the data in accordance with the sensed pressure, and writes it back into the store. The system is arranged and intended to simulate conventional graphics tools, such as pencil paintbrush or airbrush, and the artist exerts control over the parameters of the line "drawn" in the image store in the same way, so that the width and other attributes of the line are controlled as the stylus moves. Thus, the stored image data comprises a direct representation of the line itself, corresponding to a manually painted line.

A problem with video graphics systems is that much of the image manipulation can only be done in response to operator commands. The image data is stored in a form which can be understood by a human operator and not in a form which can be easily understood by a machine. Consequently, machine manipulation of the image data is difficult.

In computer graphics, as distinct from video graphics, image data is stored in machine readable form and final images are produced on a frame by frame basis in a process known as rendering. Complex computer graphics algorithms are known, capable of producing very impressive images. However, the rendering process may take several hours to complete, even when running on very fast machines. Such a situation may be acceptable when producing glossy one off images but in many applications such a demand on computer time is unacceptable and cannot compete with human operation.

An example of an operation in which a large number of images must be produced at reasonable cost is animation. Conventionally, an animator produces a series of key frames as very rough pencil sketches. The animators skill is that of being able to work in the temporal domain. Other artists are then required to complete each of the key frames and, furthermore, to create inbetween frames, thereby providing sufficient frames such that, when shown as a sequence at sufficient speed, smooth movement of characters is perceived by a viewer.

It is known in computer graphics to represent objects as parametric curves, the curve shape being specified and controlled by data representing the positions of points on the curve and the tangents thereat; as disclosed in, for example, "Interactive Computer Graphics", P Burger and D Gillies, 1989, Addison Wesley, ISBN 0-201-17439-1.

In "Hairy Brushes", Strassman, 1986 Siggraph Conference Proceedings (Vol 20, No 4, Page 225-232), a system for emulating paintbrushes of a particular kind is described in which a brush stroke is first defined by data specifying the linear trajectory of the brush (as point positions and tangents), and the pressure applied to the brush (which in turn specifies the width of the stroke normal to the line running along the trajectory), and then the colour profile laterally across the brush stroke is specified by the user defining a profile of individual bristle colours laterally across the brush stroke. It is suggested that profiles could be defined at the start and end of the stroke, and the colour profile along the stroke be interpolated from the end values.

As that system is intended to simulate particular types of existing brush, it makes a distinction between properties of the stroke (its trajectory and its pressure—dictated width) and those of the brush (its colour profile).

WO84/02993 shows a system for generating images, in which an image path is dictated by Bezier control points. It is possible to vary the width of the entire stroke defined by the path, as a whole, but not to provide a varying width along the stroke; the object of that proposal is to create a stroke of uniform width.

U.S. Pat. No. 4,897,638 shows an image processing system in which it is possible to specify a varying stroke width, but only at the control points used to specify the curvature of the path.

SUMMARY OF THE INVENTION

According to a first aspect of the present invention, there is provided an image processing apparatus for generating visible output images, including visually distinct objects, characterised by processing means for generating displayable image data; input means for supplying operator defined input signals to the processing means, said input signals defining boundary lines for said objects and a sectional line identifying two boundary lines as defining an object; and storage means for storing data generated in response to said input signals and for storing attribute data defining visual attributes of the object.

In a preferred embodiment, the processing means includes a programable processing unit and video frame storage means, wherein said displayable image data are generated by repeatedly reading pixel data from the frame storage means. Preferably, the memory means stores data relating to the position of selected points defining points on boundary lines and sectional lines and the processing means calculates the position of the boundary lines and the sectional lines in response to data read from the memory means.

In a preferred embodiment, a plurality of sectional lines connect the boundary lines, each sectional line having operator defined attribute data associated therewith. Preferably, end sectional lines connect the ends of the boundary lines defining a closed object. The attribute data may define the colour and transparency of an object, each of which is variable across a sectional line.

Preferably, pixel values within an object area are rendered by interpolating attribute data between sectional lines. The position of boundary lines may be calculated at a greater definition than that of pixel positions within the frame storage means and values accorded to pixels of boundaries may depend upon the degree to which a pixel region is occupied by an object. The definition of the boundary lines may be eight times that of the pixel positions, providing smooth anti-aliased lines, after a rendering process.

According to a second aspect of the present invention, there is provided a method of generating visible output images, including visually distinct objects characterised by the steps of supplying operator defined input signals to a processing means, defining boundary lines and a sectional line, said sectional line identifying the boundary lines as defining an object, storing data generated in response to said input signals, storing attribute data defining visual attributes of the object and generating displayable image data in response to said stored data.

Preferably, the boundary lines are defined as Bezier curves and data is stored representing the position of the fixed ends of the curves, along with tangent points.

The sectional lines may be straight lines. Alternatively, said sectional lines may also be Bezier curves, defined by data similar to that for defining the boundary lines.

Other aspects and preferred embodiments of the invention will be apparent from the following description and claims.

BRIEF DESCRIPTION OF THE DRAWINGS

The invention will now be illustrated by way of example only with reference to the accompanying drawings in which:

FIG. 2a shows the effect of modiyfing the length of a tangent vector to a Bezier curve and FIG. 2b shows the effect of modifying the direction of a tangent vector for a Bezier curve;

Parametric curves are referred to in, for example, "Interactive Computer Graphics", P Burger and D Gillies, 1989, Edison Wesley, ISBN 0-201-17439-1, and "An Introduction to Splines for Use in Computer Graphics and Geometric Modelling", by R H Bartels, J C Beatty and B A Barsky, published by Morgan Kaufmann, ISBN 0-934613-27-3 (both incorporated herein by reference).

Figure 1A:
FIG. 1a shows a curved line.
Figure 1B:
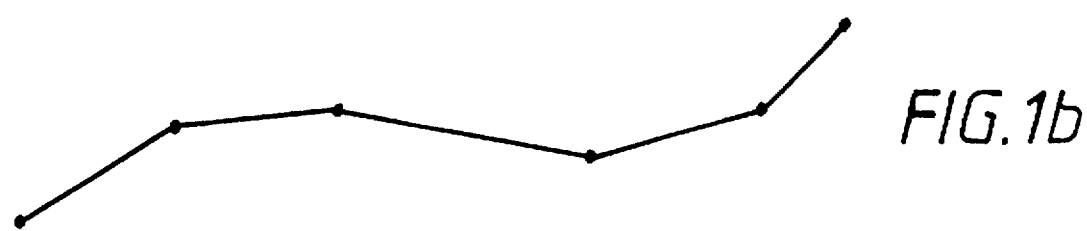
FIGS. 1b and 1c shows straight line approximations to the curved line of FIG. 1a and FIGS. 1d and 1e shown Bezier curves.
Figure 1C:
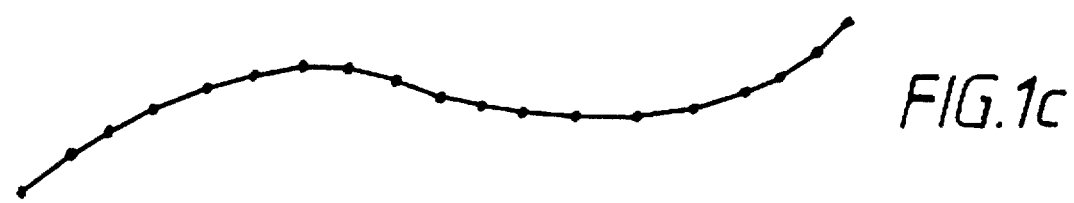

Referring to FIG. 1a a fairly smooth freehand curve is shown. Referring to FIG. 1b, one way of representing the curve would be to draw a series of straight line segments, meeting at points. However, the number of straight line segments has to be large, as illustrated in FIG. 1c, before the simulation is at all convincing.

Figure 1D:
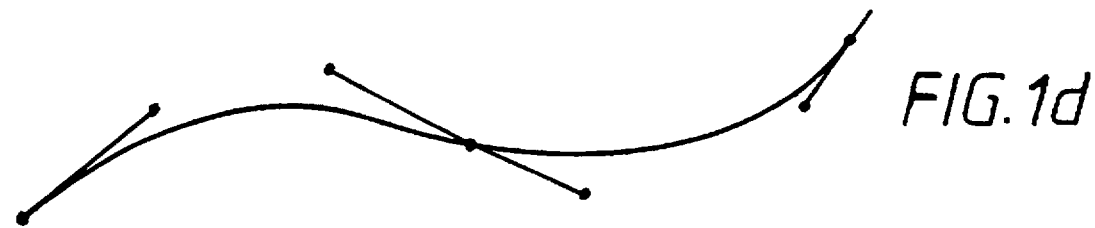

Alternatively, the curve may be represented as a series of curve segments running between points. If, as in FIG. 1d, adjacent curve segments have the same slope at the point of which they join, the curve can be made smooth.

One known type of curve approximation technique employs a cubic curve, in which the coordinate variables x and y are each represented as a third order (cubic) polynomial of some parameter t. Commonly, the value of the parameter is constrained to lie between 0 and 1. Thus, each curve segment is described as:

$$x = a_x t^3 + b_x t^2 + c_x t + d_x \quad (1)$$

$$y = a_y t^3 + b_y t^2 + c_y t + d_y \quad (2)$$

Each segment has two end points, at which $t=0$ and $t=1$. The coordinates of the $t=0$ end point are therefore $x_0=d_x$, $y_0=d_y$, and those of the $t=1$ point are given by:

$$x_1 = a_x + b_x + c_x + d_x \quad (3)$$

$$y_1 = a_y + b_y + c_y + d_y \quad (4)$$

At the end points, the slope of the curved segment is also fixed or predetermined so that each segment can be matched to its neighbours to provide a continuous curve, if desired.

The shape of the curve between the end points is defined by the slopes at the end points and by a further item of information at each point, which is conveniently visualised as the length of a tangent vector at each point. The curve between the two points may be thought of as clamped at its end points, with fixed slopes thereat, while the tangent vectors exercise a pull on the direction of the curve, proportional to their length so that, if the tangent vector is long, the curve tends to follow the tangent over much of its length. The tangent vector may be derived from the above equations (1)–(4) and vice versa; for example, where the end of the Bezier tangent vector at the t=0 point has coordinates $x_2, y_2$, and that at the end of the t=1 point has coordinates $x_3, y_3$, the coefficients a, b, c, d are given by:

$$d_x = x_0 \text{ (likewise } d_y = y_0 \text{)} \quad (5)$$

$$b_x = 3(x_0 - 2x_2 + x_3) \text{ (and likewise } b_y \text{)} \quad (6)$$

$$c_x = 3(x_2 - x_0) \text{ (and likewise } c_y \text{)} \quad (7)$$

$$a_x = 3x_2 - x_0 - 3x_3 + x_1 \text{ (and likewise } a_y \text{)} \quad (8)$$

The differential of the curve equation with respect to the variable t is:

$$c + 2bt + 3at^2 \quad (9)$$

The differential values at the t=0 and t=1 points are, respectively, $$3(x_2 - x_0) = c_x;$$

$$3(y_2 - y_0) = c_y;$$

$$3(x_1 - x_3) = c_x + 2b_x + 3a_x;$$

$$3(y_1 - y_3) = c_y + 2b_y + 3a_y$$

From these equations, by inspection, it will be seen that the length of the tangent to the Bezier control points $(x_2, x_2)$, $(x_3, x_3)$ is ⅓ that of the actual tangent vector. Although the actual tangent vector could be employed, it is mathematically more convenient to employ the Bezier tangent vector (which has the same direction but ⅓rd the magnitude).

In the so called Hermite form of a cubic equation, the data used to define a curve segment is the coordinates of the end points, the slope of the tangent vector at each end point and the length of each tangent vector. In the Bezier format, the data used to define a curve segment are the coordinates of the end points, and the coordinates of the ends of each tangent vector. Conversion between the Hermite and Bezier format is merely a matter of converting between polar and rectangular coordinates.

FIG. 2a shows the effect of varying the magnitude or lengths of the tangent vectors, while keeping their angle constant. It will be seen that the effect is to "pull" the curve towards the tangent vector, more or less strongly depending on the length of the tangent vector.

FIG. 2b shows the effect of varying the angle of the tangent vector while keeping its magnitude fixed.

Other types of cubic curve are known, for example, the B-spline, which is defined by two ends points and a plurality of intervening control points through which the curve does not pass. However, the Bezier curve description is attractive because it is relatively easy to manipulate. For example, in matching an approximated curve to an existing curve, the coordinates and tangent angles at points along the curve can directly be measured and employed. The PostScript command language used to control many laser printers employs this curve description, accepting values defining the coordinates of curve segment end points and the coordinates of corresponding tangent end points.

In general, a smooth curve is defined by a number of such end points, and two adjacent segments will share a common end point. If the curve is to be smooth, the tangent angles defined at the end point in relation to each curve segment will be equal, although the tangent vector lengths will in general not be equal.

Figure 1E:

However, as shown in FIG. 1e, it is possible to represent a line with a curvature discontinuity by providing that the tangent angle at an end point is different for each of the two segments that it defines.

A significant advantage of this form of curve representation is that a smooth, bold curve can be defined using only a small number of coefficients or control points, and parts of it can be amended without extensive recalculation of the whole line.

Figure 3:
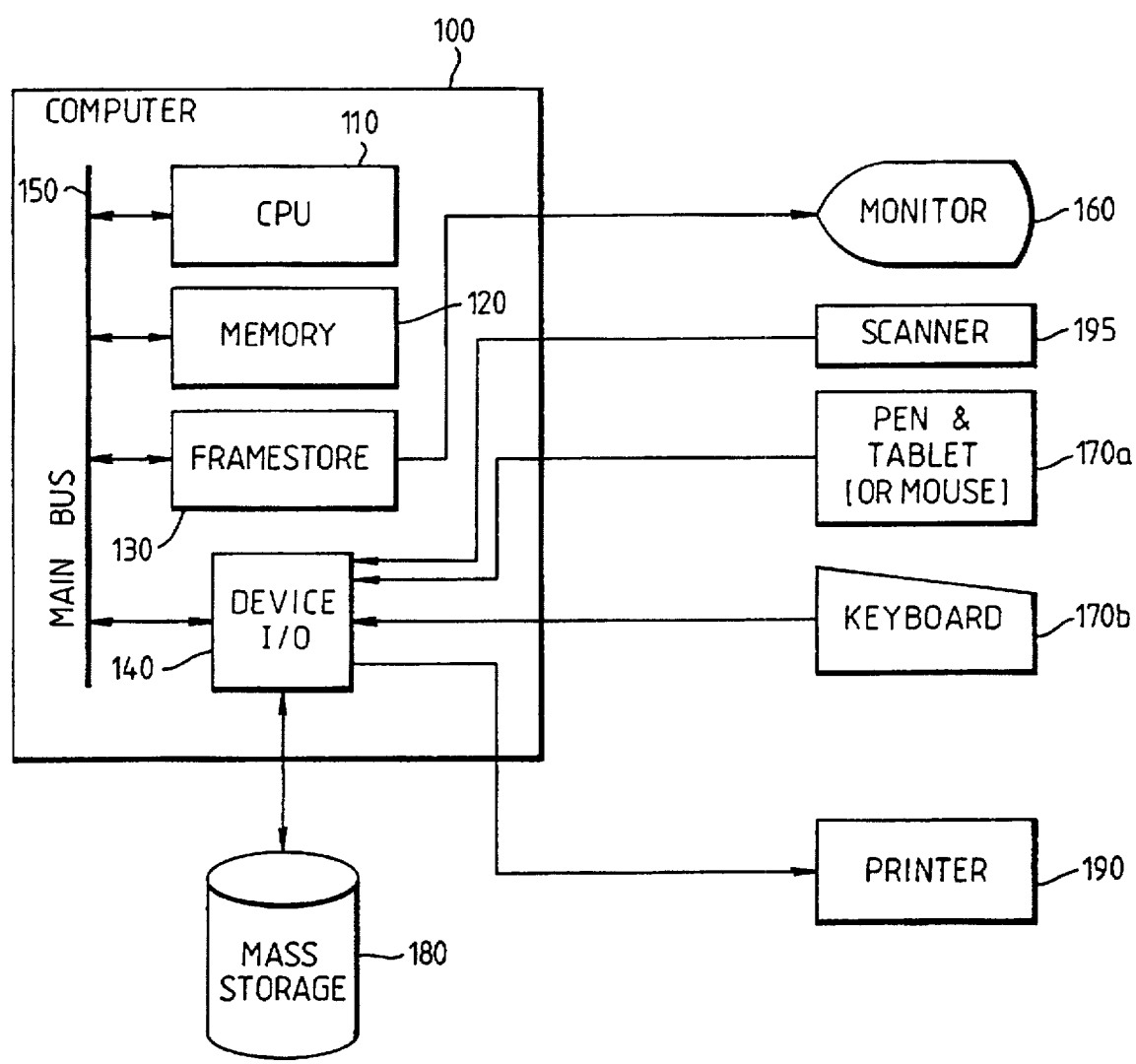
FIG. 3 shows an image processing apparatus, including processing elements, storage elements and interface elements.

Referring to FIG. 3, apparatus according to an embodiment of the invention comprises a computer 100 comprising a central processing unit 110, a memory device 120 for storing the program sequence for the CPU 110 and providing working read/write memory, a frame store 130 comprising a series of memory locations each associated with, or mapped to, a point in an image to be generated or processed, and an input/output controller 140 providing input and output ports for reading from and writing to external devices, all intercoupled through common parallel data and address buses 150.

A monitor 160 is connected to the computer 100 and its display updated from the frame store 130 under control of the CPU 110. At least one user input device 170a, 170b is provided; typically a keyboard 170b for inputting commands or control signals for controlling peripheral operations such as starting, finishing and storing the results of an image generation or image processing operation, and a position sensitive input device 170a such as, in combination, a stylus and digitising tablet, or a "mouse", or a touch sensitive screen on the monitor 160, or a "trackerball" device or a joystick. A cursor symbol is generated by the computer 100 for display on the monitor 160 in dependence upon the signal from the position sensitive input device 170a to allow a user to inspect an image on the monitor 160 and select or designate a point or region of the image during image generation or processing.

A mass storage device 180 such as, for instance, a hard disk device is preferably provided as a long term image store, since the amount of data associated with a single image stored as a frame at an acceptable resolution is high. Preferably, the mass storage device 180 also or alternatively comprises a removable medium storage device such as a floppy disk drive, to allow data to be transferred into and out from the computer 100.

Also preferably provided, connected to input/output device 140, is a printer 190 for producing a permanent visual output record of the image generated. The output may be provided on a transparency or on a sheet of paper.

A picture input device 195 such as a scanner for scanning an image on, for example, a slide, and inputting a corresponding video image signal to the computer 100 may also be provided.

One example of a suitable computer 100 is the NeXT-CUBE computer including the NeXTdimension colour board, available from NeXTComputer, Inc., U.S.A. This arrangement provides direct formatted outputs for connection to a videocassette recorder or other video storage device, and accepts video input signals. Further, it includes means for compressing images for storage on a disk store 180, and for decompressing such stored images for display.

Figure 4:
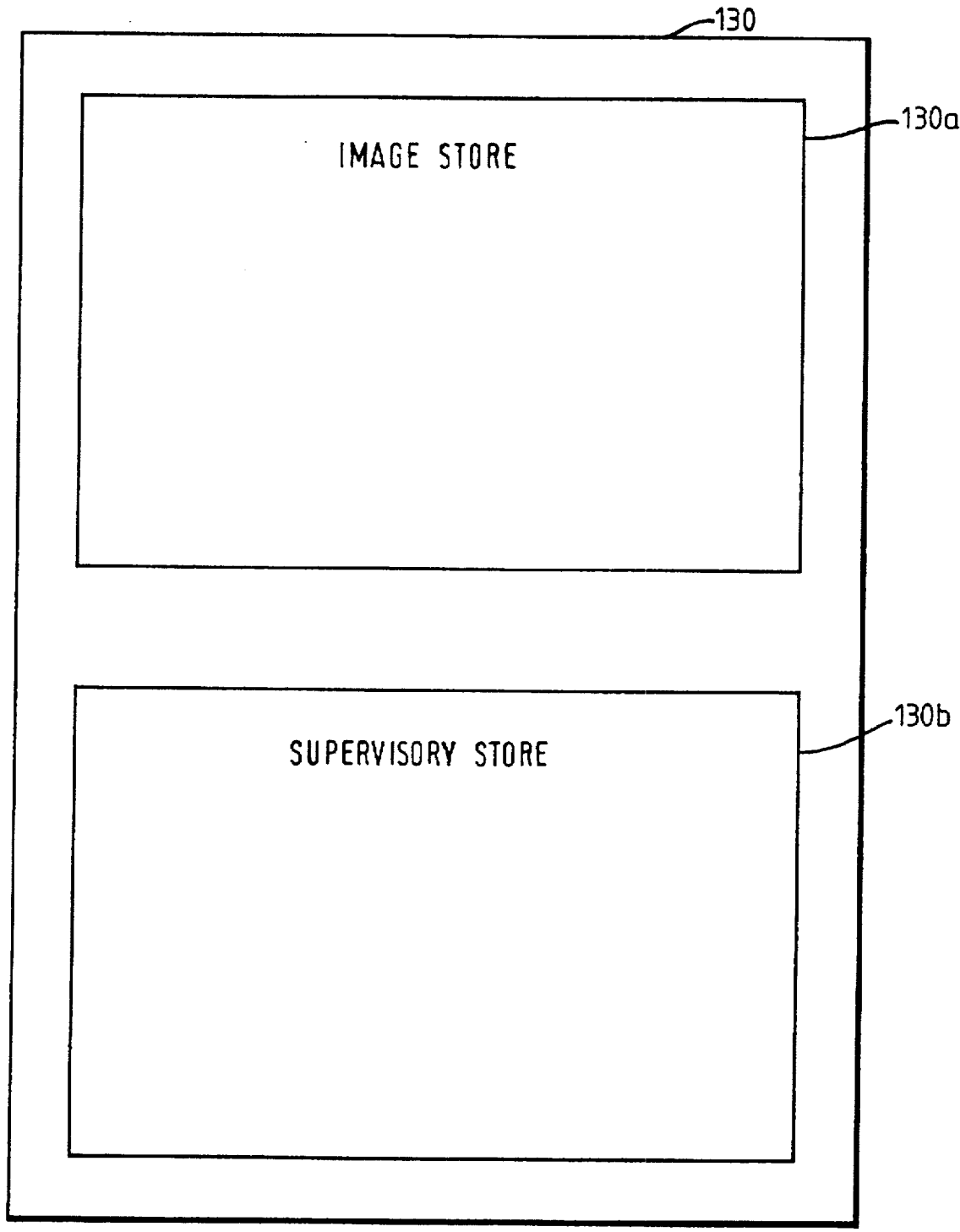
FIG. 4 schematically shows the arrangement of data in a memory forming part of the apparatus shown in FIG. 3.

Referring to FIG. 4, the frame store device 130 comprises a pair of image stores 130a, 130b. The image store 130a stores the image point, or pixel, data for the image to be generated or processed. The second area, 130b, stores a supervisory or control image displayed during generation or processing of the image stored in the store 130a. The supervisory image may be represented at a lower resolution than the generated image and/or in monochrome and hence the image store 130b may be smaller than the store 130a.

Referring to FIG. 5, the appearance of the contents of the generated image store 130a, when displayed on the monitor 160 or output by the printer 190, comprises, as shown, objects a,b each having a trajectory and a background c which also possess colour (or in a monochrome system, brightness).

The system of the preferred embodiment is arranged to generate visible output images, including visually distinct objects. These objects may be perceived as representing strokes of a graphic implement, such as a pen, pencil, brush or air brush. However, the stokes or objects may have sophistacted characteristics, such as variations in colour across their widths, which are not attainable by a single stroke of a traditional implement.

Image data may be full colour pixel related data displayable on a video monitor. The pixel data is held in frame store 130a and the definition of this data, that is to say, the number of pixel locations present within frame store 130a, is dictated by the definition required for the final output image. Thus, image data may be produced for broadcast television purposes, high definition television or film, requiring higher levels of definition.

The processing system for generating displayable image data also includes a programmable processor for generating the displayable image data in response to operator defined data.

In order to generate operator defined data, an input device is provided, which may consist of a mouse, a trackerball or a stylus and touch tablet combination, for example, or any other suitable user interface for defining two dimensional coordinate locations.

The operator does not define image data directly, unlike the aforesaid video graphics equipment and is instead provided with a system for defining objects in a machine readable form by defining boundary lines and a sectional line. Display data relating to boundary lines and sectional lines is stored in a supervisory frame store, 130b, which, typically, has a lower definition than the image store 130a.

In use, data from both stores is displayed on a monitor viewed by the operator. Each image may be selected independently or, if required, one image may be overlayed with the other.

Boundary lines define the outer edge of an object and a sectional line connects boundary lines, thereby identifying the connected boundary lines as outlining an object.

In addition to frame store 130b, for storing positional data generated by an operator, storage is also provided for storing attribute data, which defines visual attributes of the object. Thus, these attributes define the colour of the object and its transparency. Colour and transparency values are then generated for each pixel location, therefore image store 130a has pixel locations of sufficient depth for storing colour and transparency. Colour in the image store may be stored as luminance plus colour difference signals or, preferably, as full colour RGB signals.

Data stored in supervisory store 130b identifies supervisory data which may be represented in a plurality of colours, although full colour storage is not required.

Figure 5A:
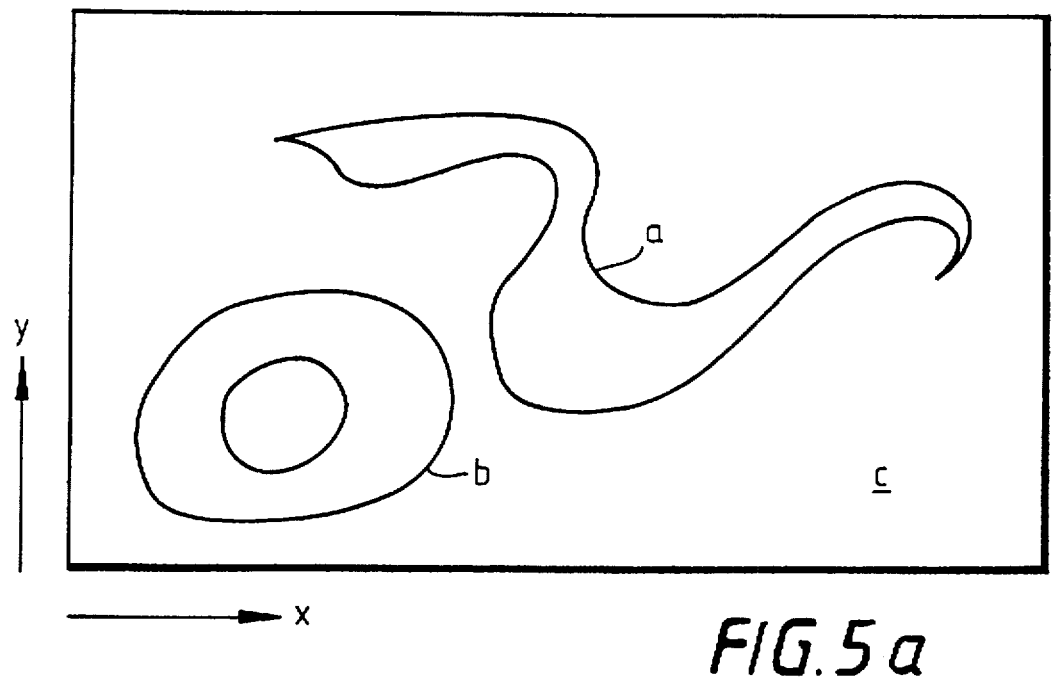
FIGS. 5a and 5b show displays produced by the apparatus shown in FIG. 3.

The contents of the generated image frame store 130a therefore comprise a plurality of point data defining colour and/or intensity of each of a plurality of points to be displayed to form the display shown in FIG. 5A, for example, 500×500 image point data, each comprising colour or brightness information as a multi-bit digital number. Typically, several bits representing each of Red (R), Green (G) and Blue (B) are provided. Preferably, the frame store 130a is of the type which stores additionally a transparency value for each image point to allow the generated image to be merged with another image. The address within the store 130a of given point data is related, or mapped, to its position in the display of FIG. 5A, which will hereafter be referred to in X (horizontal position) and Y (vertical position) Cartesian co-ordinates.

Figure 5B:
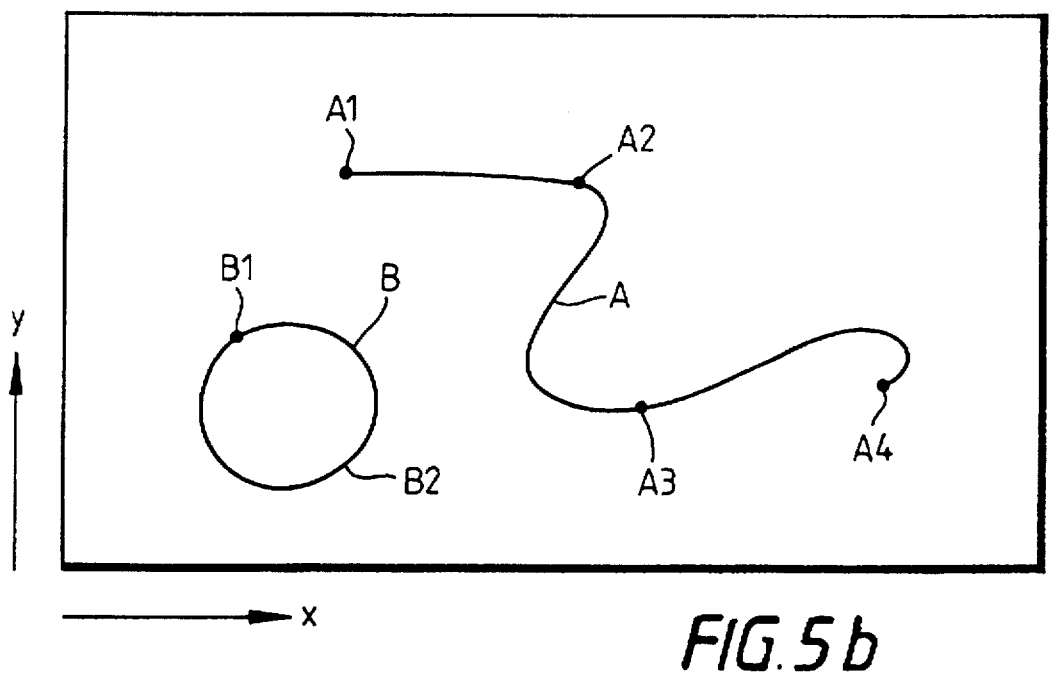

Likewise, the contents of the supervisory image store 130b comprise point data for a plurality of points making up the image of FIG. 5B; in this case, however, the display may comprise only a monochrome line and the point data may for each point merely comprise a single bit set to indicate either a dark point or a light point.

Referring to FIG. 5B, a line shown on the supervisory display image in FIG. 5B is therefore represented by a plurality of pixel values at corresponding X,Y positions within the supervisory image store area 130b. However, this representation of the line is difficult to manipulate if the line is to be amended. A second representation of the line is therefore concurrently maintained in the working memory area 121 of the memory device 120. This representation comprises a plurality of data defining the curve in vector form. Conveniently, each curve is represented by the position of points ("control points") between which intervening curve values can be derived by calculation.

In this embodiment of the invention, display frames, consisting of line drawings of objects, are created and/or edited with reference to stored control point data, preferably data stored in the Bezier format referred to above. In other words, a stored representation of a display frame comprises a plurality of control points which define line segments which make up a line representation.

Figure 6:
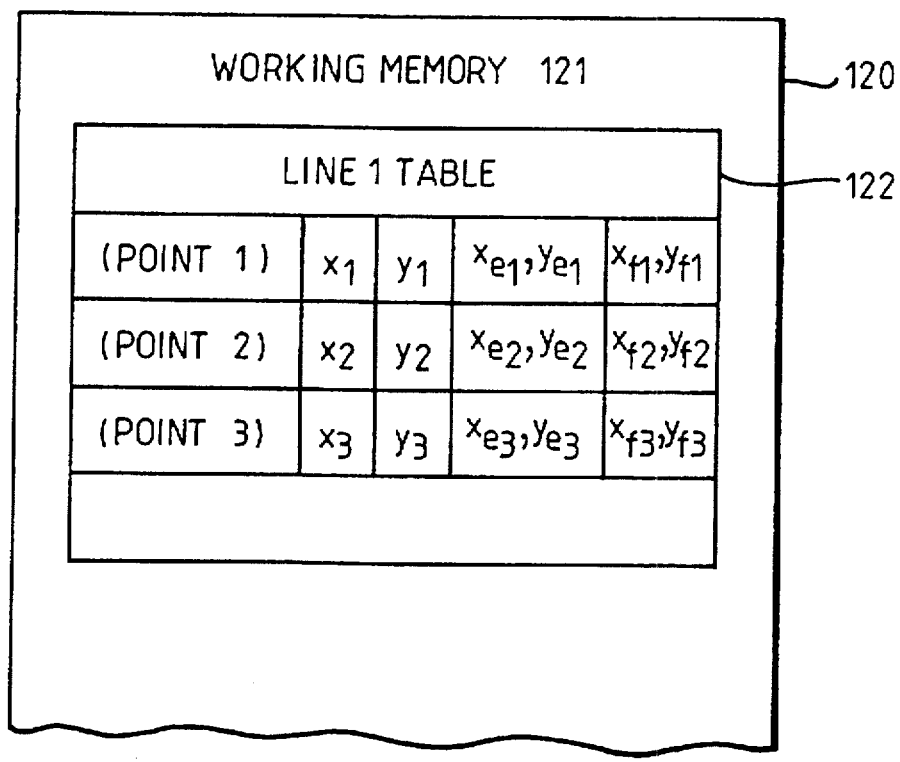
FIG. 6 shown a schematic representation of data stored in memory forming part of the apparatus shown in FIG. 3.

For each line A,B, a table 122 is provided in the working memory 121 storing the control point data for that line as shown in FIG. 6. Conveniently, the curve connecting the points is a spline curve, as discussed above, and preferably a Bezier curve; it is therefore defined by $$x = a_x t^3 + b_x t^2 + c_x t + d_x$$

$$y = a_y t^3 + b_y t^2 + c_y t + d_y$$

where a,b,c,d are constants and t is a parameter allocated values between 0 and 1.

In the Bezier curve format the data are stored as a plurality of point data each comprising point x,y co-ordinates, and data representing slope value for the tangent to the curve at those coordinates, and a tangent magnitude parameter indicating (broadly speaking) the extent to which the curve follows the tangent. This format is used, for example, in control of laser printer output devices. The data may be stored as point coordinates x and y, and tangent angle and length (Hermite form), but is conventionally and conveniently stored as point coordinates x and y and tangent end coordinates. In the following, 'Bezier' format will be used to describe both. Full details will be found in "An Introduction to Splines For Use in Computer Graphics and Geometric Modelling" R H Bartels et al, especially at pages 211–245, published by Morgan Kaufmann, ISBN 0-934613-27-3.

Each control point is thus represented by data comprising positional data $(x_i, y_i)$ representing the position within the area of the display of that control point, and tangent data $(x_{ei}, y_{ei}, x_{fi}, y_{fi})$ defining two tangent end points associated with the curved segments on either side of the control point. The tangent extent point data $(x_{ei}, y_{ei}, x_{fi}, y_{fi})$ are stored as position data X, Y defining the position of the tangent end point. It would also be possible to store instead the x,y offsets from the control point position.

Complex curved lines can be represented by a number of such control points, two (at least) for each inflexion in the line. The control points stored in the line table 122 each define, between adjacent points, a line segment described by a corresponding cubic equation, and are the values at which the parameter t in that equation is 0 and 1. As intervening points in the line (e.g. POINT 2) play a part in defining two neighbouring line segments, each is effectively two control points and consequently has data defining two stored tangents.

Although the above described Bezier format is particularly convenient, other parametric ways of representing a curve by control points may be employed, such as the B-spline form, in which the curve control points are not required to lie upon the curve which they characterise.

Figure 7:
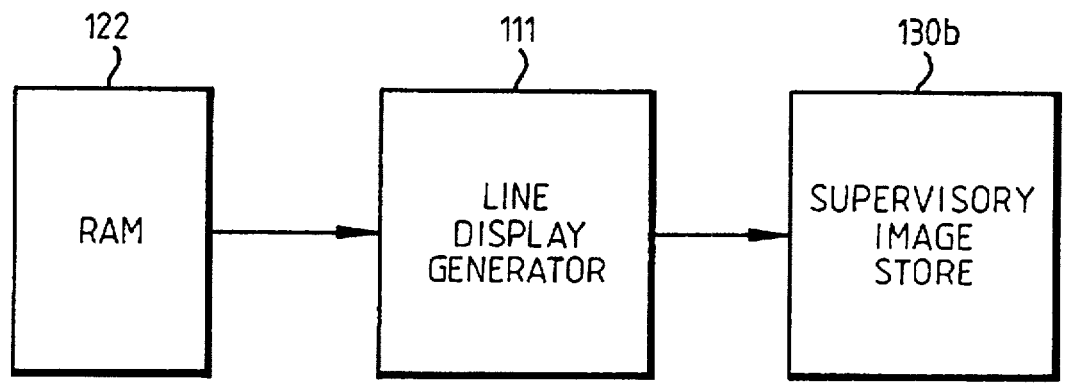
FIG. 7 shows a schematic representation of the functional elements of an apparatus for generating a display.

Referring to FIG. 7, to generate the supervisory display shown in FIG. 5B, supervisory display generating means 111 reads the control point data from the corresponding line table 122 in the memory 120, and calculates the values of intervening points on the curve. It then accesses the supervisory display image store 130b and sets the values of the corresponding image points therein, to cause display of the generated line on the monitor 160. In practice, the line generating means 111 comprises the CPU 110 operating under control of a program stored in a program store area of the memory 120.

If the display device onto which the supervisory display is to be shown is arranged to accept a vector input signal, the supervisory display image store 130b is unnecessary and the generating means 111 supplies vector information from the table 122 to the display, for example as a command in the "Postscript" graphics computer language.

Separate monitor devices 160a, 160b could be provided, one for each of the supervisory display and generated display; for instance, the supervisory display monitor may be a monochrome personal computer monitor provided with the computer 100 and the monitor 160b for the generated image a high resolution colour monitor. Alternatively, the computer 100 may be arranged to alternately select one of the supervisory display and generated image display for display on the monitor 160, by alternately connecting the frame stores 130a or 130b thereto. Normally, the supervisory display would be shown, except when it is desired to view the effect of editing an object in the generated image.

Alternatively, a single monitor 160 could be arranged to display both displays adjacent or one overlaying the other as a window. In a further alternative, the outputs of both the frame stores 130a, 130b may be connected so that the supervisory display overlies the generated image; in this case, the supervisory display may be indicated by dashed lines or in any other convenient manner so as not to be confusable with the generated image.

Figure 8:
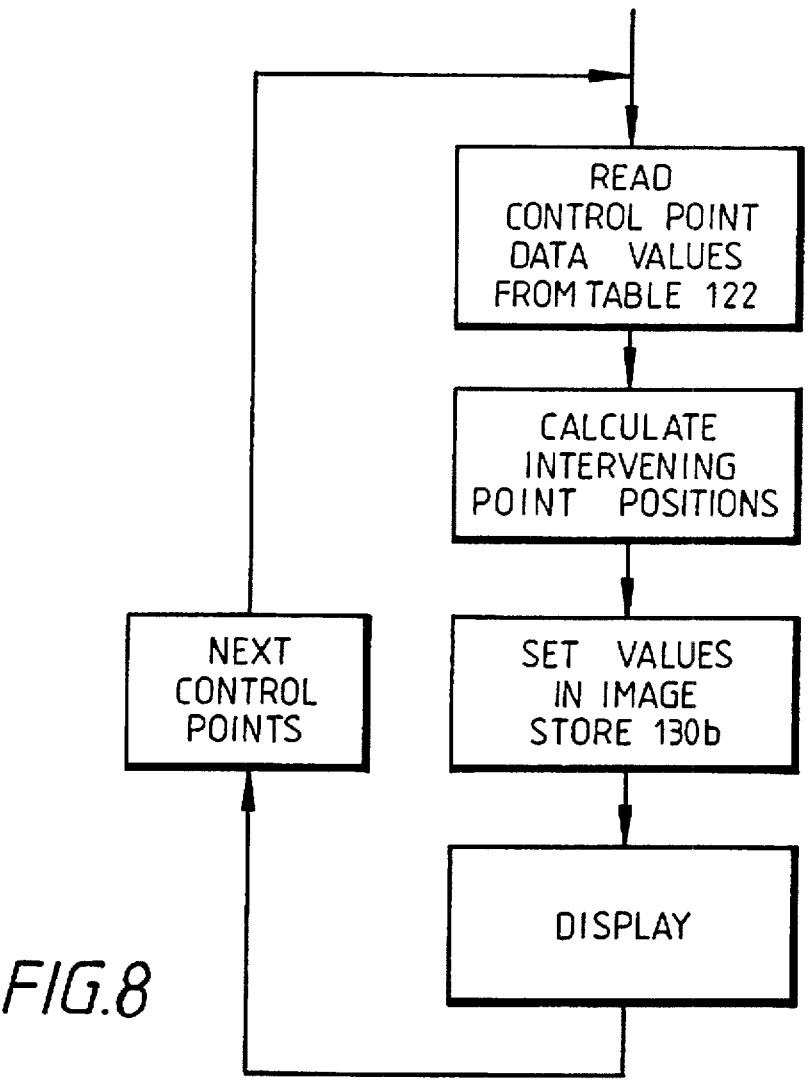
FIG. 8 shows a schematic representation of the process by which the apparatus produces a display.
Figure 9:
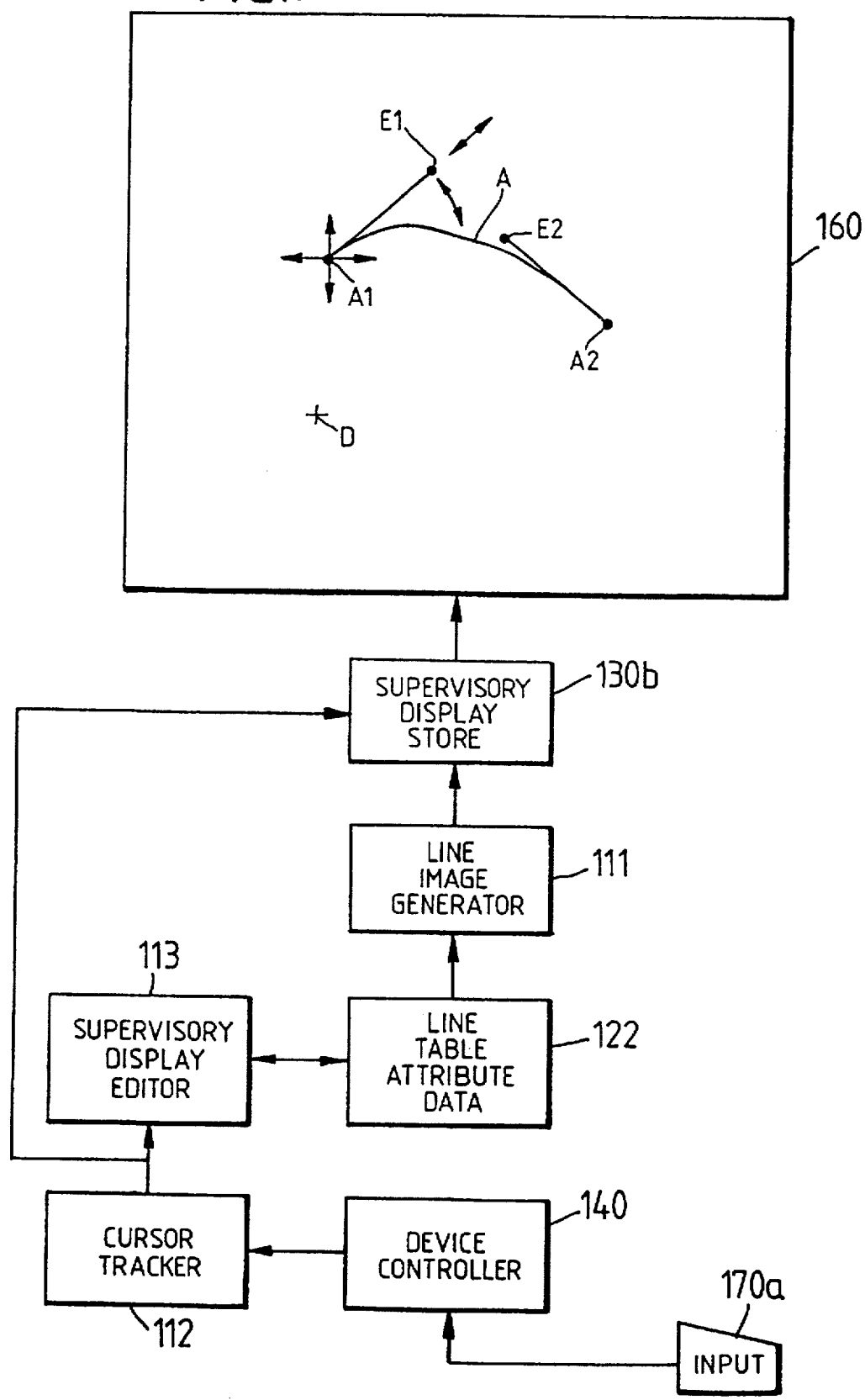
FIG. 9 shows a schematic representation of the functional elements of the apparatus of FIG. 3, for allowing the input of data to produce a display.
Figure 10:
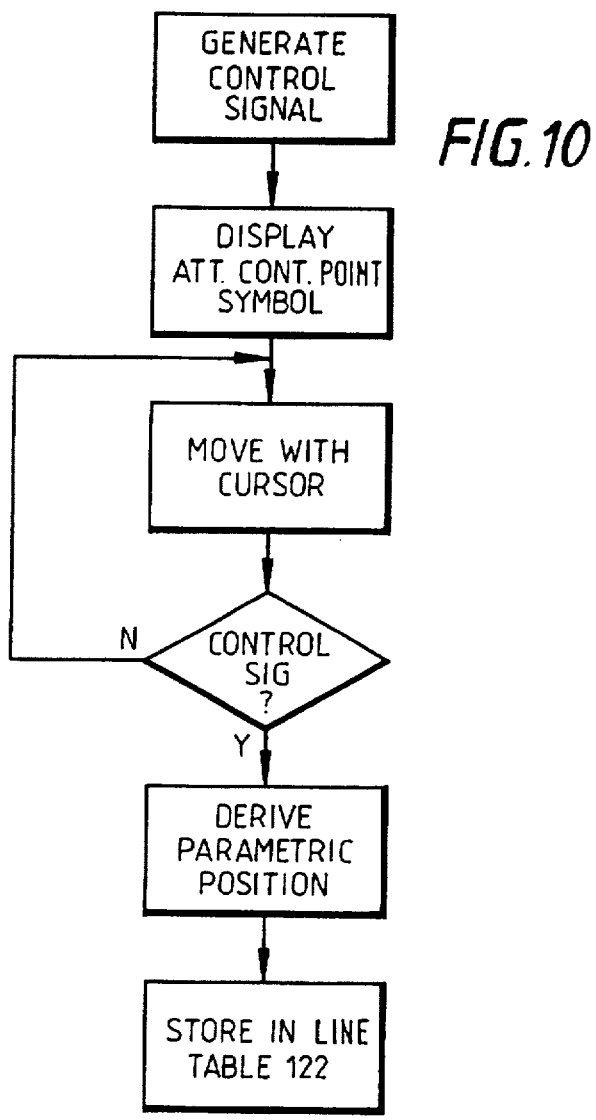
FIG. 10 shows a process performed by the apparatus for receiving input data.

The general flow of operation in generating the lines shown in the supervisory display on the display device 160, from the data held in the table 122, is shown in FIG. 8.

In one method of generating a line, the position and tangent data for a pair of adjacent control points is read from the table 122, and the parameters a,b,c,d of equation 1 are derived therefrom. A large number of intervening values of the parameter t between 0 and 1 are then sequentially calculated to provide x,y coordinates of interventing points along the line, and these are quantised to reflect the number of image points available in the supervisory display, and corresponding point data in the supervisory image store 130b are set. Once all intervening points between that pair of control points have been calculated, the supervisory display generator 111 accesses the next pair of points in the table 122. This method is relatively slow, however; faster methods will be found in the above Bartels reference.

The curve or path vector data held within the line tables 122 may have been stored therein from different sources. For instance, the data may be read from a file within the mass storage (for example disk) device 180. Alternatively, they could be derived by fitting a spline approximation to an input curve represented by data derived, for instance, from a scanner or from a user operated digitising pad and stylus. However, a particularly preferred method of allowing the input and modification of the point data will now be described.

Editing may involve either modifying the trajectory of existing lines or (more rarely) adding new lines. It is therefore necessary both to amend the data held in the frame table 122, and desirably to amend the image data in the image store 130 so as to enable the user to view the effects of the change. It is found that the best way of providing the user with means for amending the frame data stored in the table 122 is to allow him to employ a position sensitive input device 170a, so as to appear to directly amend the displayed representation of the frame on the screen monitor 160.

In this embodiment, a user manipulates the position sensing input device 170a, such as a mouse, by moving the device 170a so as to generate a signal indicating the direction and extent of the movement. This signal is sensed by the device input/output controller 140, which provides a corresponding signal to a cursor position controller 112 (in practice, provided by the CPU 110 operating under stored program control) which maintains stored current cursor position data in x,y co-ordinates and updates the stored cursor position in accordance with the signal from the device input/output controller 140. The cursor position controller 112 accesses the supervisory display store area 130b and amends the image data corresponding to the stored cursor position to cause the display of a cursor position symbol D on the supervisory display shown on the monitor 160. The user may thus, by moving the input device 170a, move the position of the displayed cursor position symbol D.

In a preferred embodiment, the supervisory display line generator 111 is arranged not only to write data corresponding to the line A into the supervisory display store 130b, but also to generate a display of the control point data. Accordingly, for each control point $A_1, A_2$, the supervisory image generator 111 writes data representing a control point symbol (for example, a small dark disc) into the image store 130b at address locations corresponding to the control point co-ordinates x,y.

Further, the supervisory image generator 111 preferably, for each control point, correspondingly generates a second control point symbol $E_1$ located relative to $A_1$ along a line defined by the control point tangent data at a length determined by the control point magnitude data; preferably, a line between the two points $A_1$ and $E_1$ is likewise generated to show the tangent itself.

To enter a line A, the user signals an intention so to do (for example by typing a command on the keyboard 170b, or by positioning the cursor symbol at a designated area of a displayed control menu), positions the cursor symbol D at a desired point on the display 160, by manipulating the position sensitive input device 170a and generates a control signal to indicate that the desired point has been reached. The cursor position controller 112 supplies the current cursor position data to the table 122 as control point position co-ordinates, and the supervisory display generator 111 correspondingly writes data representing a control point symbol into the image store 130b at address locations corresponding to the control point co-ordinates. The user then inputs tangent information, for example via the keyboard 170b, or in the manner described below. When a second path control point has been thus defined and stored in the table 122, the supervisory image generator 111 will correspondingly generate the line segment therebetween on the supervisory display by writing the intervening image points into the supervisory display store 130a.

To amend the shape or path of the line A displayed on the supervisory display, a user manipulates the input device 170a to move the cursor position symbol D to coincide with one of the control point symbols $A_1$ or $E_1$ on the display 160. To indicate that the cursor is at the desired position, the user then generates a control signal, for example by clicking the mouse input device 170a. The device input/ output controller 140 responds by supplying a control signal to the cursor position controller 112. The cursor position controller 112 supplies the cursor position data to a supervisory display editor 113, (comprising in practice the CPU 110 operating under stored program control) which compares the stored cursor position with, for each point, the point position (X,Y) and the position E of the end of the tangent.

When the cursor position is determined to coincide with any point position A or tangent end position E, the display editor 113 is thereafter arranged to receive the updated cursor position from the cursor controller 112 and to amend the point data corresponding to the point $A_1$ with which the cursor symbol coincides, so as to move that point to track subsequent motion of the cursor.

If the cursor is located at the point $A_1$ on the curve A, manipulation by a user of the input device 170a amends the position data $(X_1,Y_1)$ in the line table 122, but leaves the tangent data unaffected. If, on the other hand the cursor is located at an end of tangent point $E_1$, manipulation by a user of the input device 170a alters tangent end point data in the line table 122 within the memory 120, leaving the position data (x,y) unaffected.

In either case, after each such amendment to the contents of the line table 122, the supervisory display generator 111 regenerates the line segment affected by the control point in question within the supervisory display image store 130b so as to change the representation of the line on the supervisory display.

Once a line has been amended to a desired position, the user generates a further control signal, by clicking the mouse input device 170a, and the supervisory display editor 113 thereafter ceases to amend the contents of the memory 120. The cursor controller 112 continues to update the stored cursor position.

This method of amending the line representation is found to be particularly simple and quick to use.

The relationship between the contents of the supervisory image store 130b and the generated image store 130a will now be discussed in greater detail.

Referring to FIG. 5a and FIG. 5b, the display of FIG. 5b represents only lines, and corresponds to, for example, the output of an animation program or a PostScript (TM) page design program. The objects a,b shown in FIG. 5a correspond to the lines A,B shown in FIG. 5b insofar as their general trajectory or path is concerned, but differ therefrom by displaying one or more of the following additional attributes:

Colour: Each object a,b in FIG. 5a may be coloured, and the colour may vary along the line of each object. The profile of colour across the width of the object may also be non-constant.

Opacity: An object a,b may be given the appearance of a semitransparent object positioned in front of the background c, by providing that the colour of a part of the object a, be influenced by the colour of the background c, to an extent determined by an opacity parameter varying between 0 (for a transparent or invisible object, the colour of which is entirely dictated by the colour of the background c) and unity (for an entirely opaque object, the colour of which does not depend on that of the the background c). The effect of the opacity of the object is significant when the object is moved, since parts of the object exhibiting some transparency will show an altered appearance depending upon the colour of the background c.

The manner in which these attributes of the generated line shown in the display of FIG. 5a may be manipulated by a user will now be discussed in general terms.

The objects a,b to be displayed are represented within the frame store 130a, in a similar form to that in which they would be represented by a computer painting system, that is, as an array of pixel data. However, changing the representation of attributes in this form requires a very large amount of data processing, since a large number of pixel values must be amended. Further, it is not possible to change the position or shape of a line while leaving others of the above listed attributes unaffected.

Figure 11:
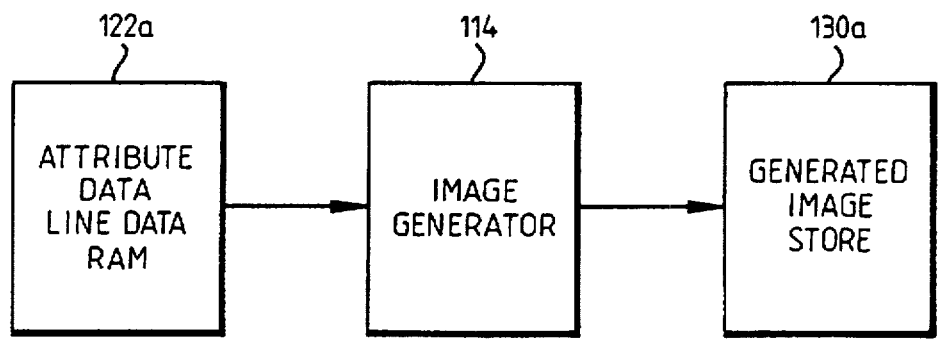
FIG. 11 shows a schematic represetation of the functional elements of the apparatus for producing a display.

Rather than storing colour information for every image pixel in the object a or b, this embodiment accordingly stores information corresponding to attributes of the object associated with predetermined points along the lines shown in the supervisory display and the corresponding values at intervening points in the object are generated by an image generator device 114 shown in FIG. 11 comprising, in practice, the CPU 110 operating under stored program control, and the generated image data stored at corresponding positions within the generated image store 130a for display on the generated image display on the monitor 160.

The generation of an image may be considered as taking place in two stages. Firstly, in response to operator commands, a control image is generated, control data is stored and a representation of this data is supplied to the supervisory store, allowing the data to be interactively viewed by the operator.

The operator works in relation to a cartisian coordinate reference, the definition of which is user selectable up to the operating constraints of the system.

A suitable operating environment consists of a work station based around an Intel 486 microprocessor, providing 32 bit floating point arithmetic. Thus, any point position may be calculated in 32 bit floating point arithmetic providing a very high spatial definition.

Upon start-up, a notional x/y frame is provided with coordinate locations separated by 1/72 inch points, providing 500 identifiable locations in both the x and y directions. To facilitate detailed work, this area may be zoomed up, by up to a factor of 64 times. However, these values are only arbitrarily defined and may be adjusted to suit a particular environment, if necessary. Upon each zooming operation, x/y coordinates defining lines are recalculated, thereby retaining line smoothness irrespective of zoom magnification.

An object generated by the system may be considered as a brush stroke although, given the level of sophistication provided by the system, details such as colouring and transparency may be modified across the stroke and a whole object or a significant part of an object may be represented by a single stroke. For example, data representing a single stroke may be sufficient to define a complete cherry stalk, with colouring and shading creating the illusion of depth.

The extent of a stroke or object is defined by boundary lines. Each boundary line is a Bezier curve, generated in response to control points. A control point fixes the position of a Bezier curve within the coordinate frame. Individual transformations may be performed on the control points, in response to user operations, or affine transformations may be performed on a collection of points. Such modifications are stored by modifying data representing the Bezier descriptions and the actual lines resulting from these Bezier descriptions are redrawn on a frame by frame basis.

Two lines are defined as boundary lines for an object by connecting them with a sectional line. A sectional line may connect with a boundary line at a control point, thereby fixing the position of the sectional line or, alternatively, the connecting point need not be a control point and is referred to as an attribute point, in which case the sectional line will be modified in accordance with movements to the boundary line.

Figure 12:
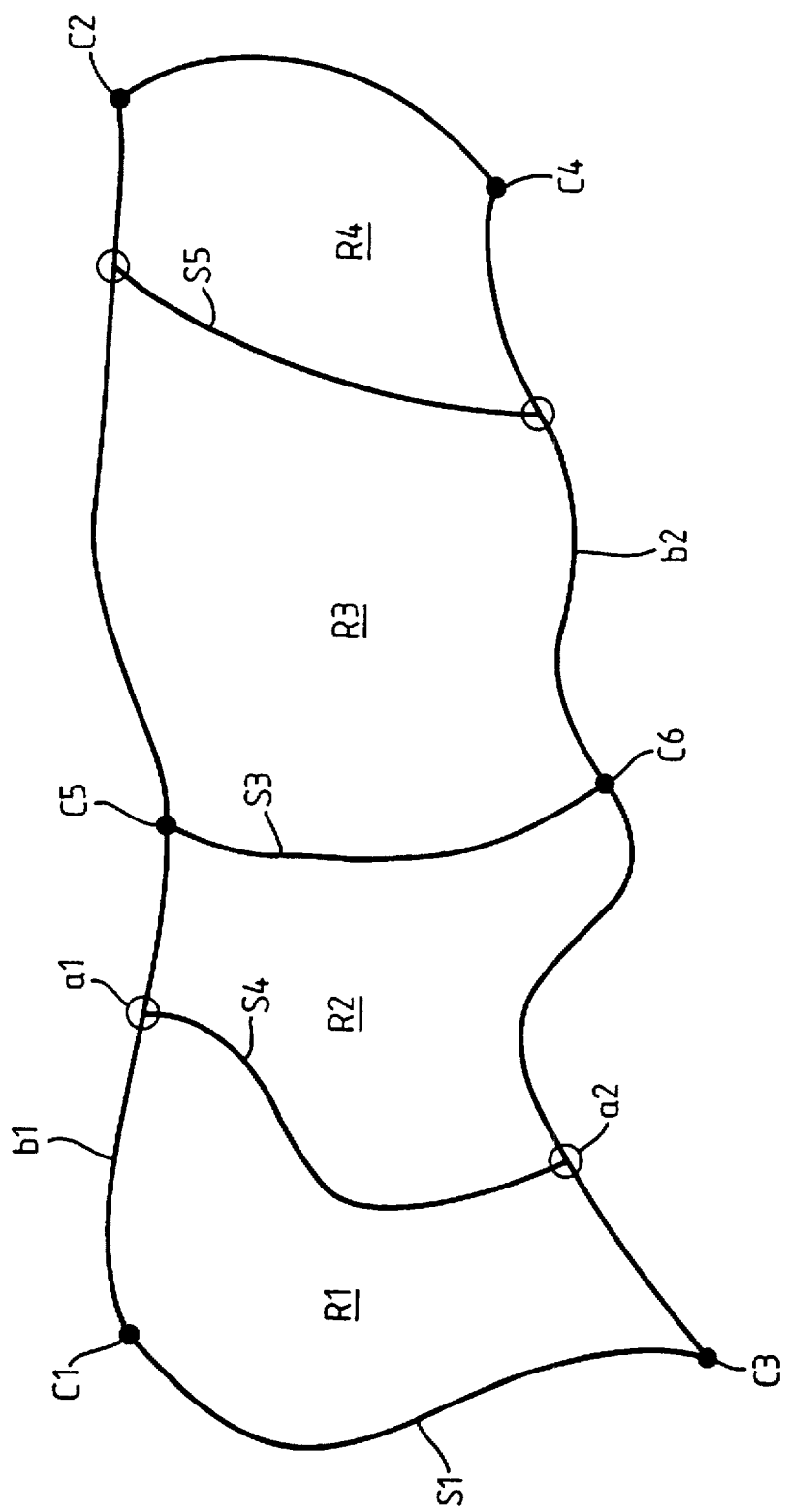
FIG. 12 illustrates boundary lines and sectional lines defining the position of an object, including a plurality of regions.

An example of a stroke is shown in FIG. 12. In the first mode of operation, supervisory store 130b (FIG. 4) within frame store 130 (FIG. 3) is active and generates image signals which are supplied to monitor 160. In addition, a cursor is displayed on monitor 160 which responds, spatially, to operation of the mouse 170a.

From a menu, or similar means, an operator identifies a desire to create a control point C1 and moves the mouse so that the cursor is displayed at the desired position of control point C1. On clicking the mouse the x and y locations of the control point 1 are recorded in working memory, in a table of the form shown in FIG. 6. The operator now moves the mouse so that the cursor is displayed at the position required for a second control point C2 and on clicking the mouse again, point C2 is created.

Within the operating software of the system, a subroutine for generating Bezier curves is provided and on selecting the second control point C2, a call is made to this subroutine. In response to this call, x/y coordinate positions along the Bezier curve are generated and this data is written to the supervisory store 130b, resulting in a boundary line B1 being displayed on the monitor 160.

For the sake of clarity, boundary lines are drawn with a width of one pixel and cannot be antialiased. However, this line is only a representation of the mathematical definition of the boundary line, which can be rendered at any desired definition.

In a similar operation to that described above, control point C3 and C4 are generated which are then connected by a boundary line B2, using Bezier curves.

A two dimensional object is identified by connecting the boundary lines B1 and B2 together by a sectional line. In a preferred mode of operation, control point C1 is connected to control point C3 by a sectional line S1 and control point C2 is connected to control point C4 by a sectional line S2, thus defining a closed region or object C1, C2, C4, C3.

The sectional lines S1 and S2 are also Bezier curves and an additional line table, of the type shown in FIG. 6, is required to define the position of such sectional lines.

A third sectional line S3 is generated between control point C5 and C6, again generated by placing the cursor, in response to movements of the mouse, at the required positions along the boundary lines B1 and B2. Thus, control point C5 and C6 not only identify the position of sectional lines S3 but also control the shape of Bezier curves C1 C5, C5 C2, C3 C6 and C6 C4.

Sectional lines define attribute data consisting of colour and transparency.

Rather than storing colour data for each point along the section through the line, preferably the colour data stored comprises the colour value for each of a small number of points along the cross-section, and the image generating means 114 correspondingly generates the colour values at the intervening points by interpolation therebetween. Colour values are set at a colour control point. The positions therebetween of the intervening points could be predetermined but are preferably selectable by the user, in which case an indication of the position along a sectional line is stored with each value. Preferably, the position data stored comprises a fraction of the distance along the sectional line.

Opacity or transparency data, specifying, as a fraction, the relative dependence of the colour of the object a on the colour data for the object a relative to the colour data for the background, is likewise stored in the line table 122 corresponding to opacity control points $H_1, H_2$ in the same manner as described above for colour data, except that an opacity value is stored rather than a colour value. It is therefore possible to vary the degree of transparency of the object across its section, as well as along its length.

The image generator 114 is therefore arranged preferably to derive colour data values by interpolating between colour control points, and to do likewise to derive transparency values and, finally, to set the colours of image points stored in the generated image store 130a by reading the stored background colour and forming, for each image point, the interpolated colour value multiplied by the interpolated opacity value, together with the background colour value multiplied by unity less the interpolated opacity value.

The process of setting and amending the values of the above attributes will now be discussed in greater detail.

To set up the attribute values for an object a to be displayed on the monitor 160, the user generates a control signal (typically by typing an appropriate command on the keyboard 170b, or by positioning the cursor symbol on a specified part of the screen of the monitor 160 and clicking the mouse), indicating that an attribute is to be input or added to the object.

An operator positions the cursor symbol at a point on the line A shown on the supervisory display and generates a further control signal by clicking the mouse 170a. The supervisory display editor 113 receives the cursor position from the cursor controller 112, and writes a corresponding attribute control point symbol into a corresponding position in the supervisory display image store 130b, which is consequently subsequently displayed on the monitor 160.

The stored cursor position indicating the position along the line at which the control point is placed by the user is then processed for storage in the attribute line data within the line table 122 in the memory 120. The cursor position is not directly stored since, if the user subsequently repositioned the line as discussed above, the attribute control point would no longer lie on the line. Instead, an indication of the relative position along the line, between its two neighbouring curve control points, is derived and this indication is stored so that the position of the attribute control point is defined relative to the position of the line, regardless of subsequent redefinitions of the line position.

This may be achieved, for example, by accessing the line table, reading the Bezier control point information, deriving therefrom the cubic spline equation 1 above and solving for a value t at the cursor X,Y coordinates if the cursor is not exactly on the line. The value of t at the closest point on the line is derived, for example to set $(x-x_t)^2+(y-y_t)^2$ to a minimum. The value of the parameter t is then stored as an entry in the attribute data within the line table 122.

Figure 15:
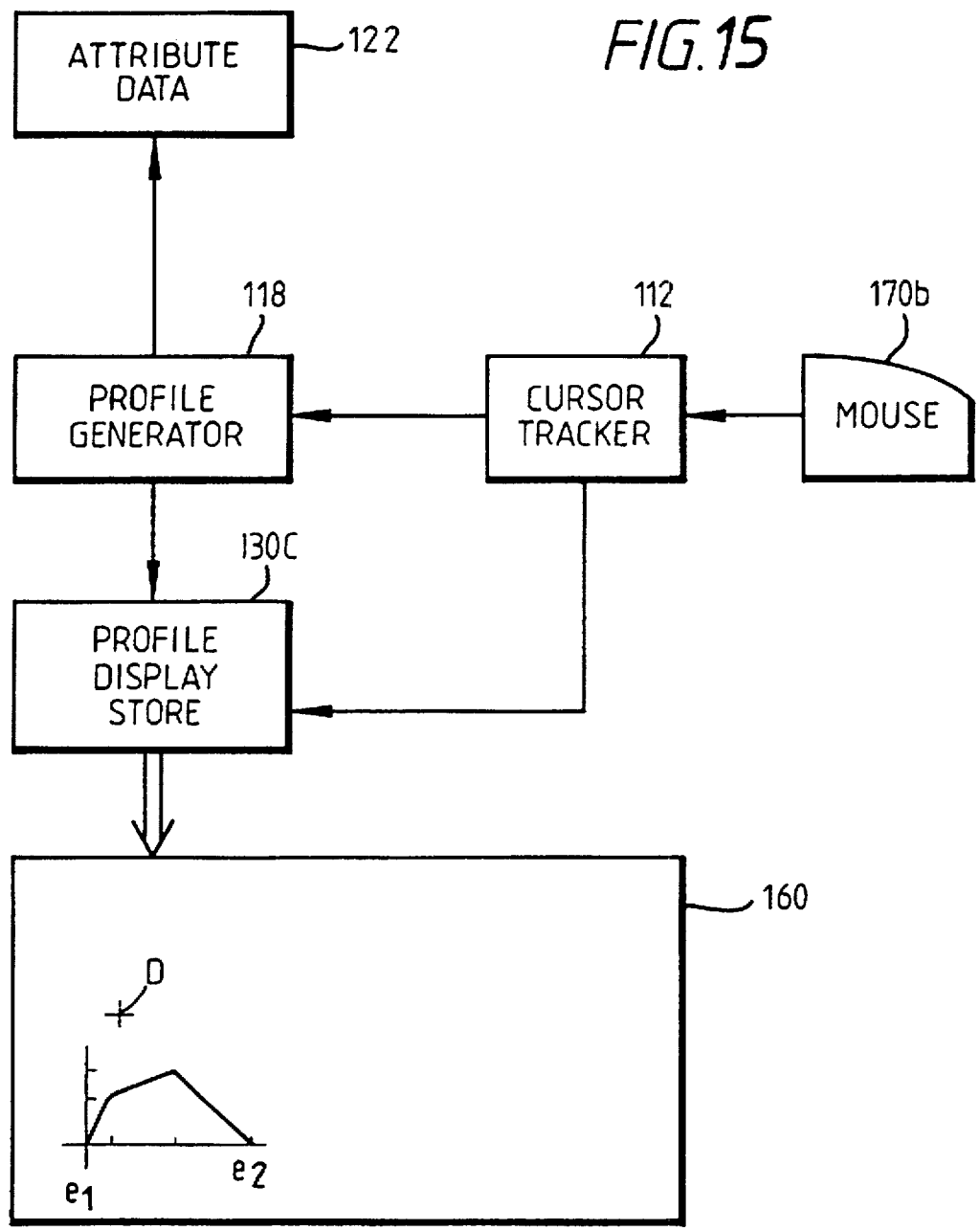
FIG. 15 shows a schematic representation of an arrangement forming part of the apparatus; and, FIG. 16 schematically shows a process performed by the apparatus.
Figure 16:
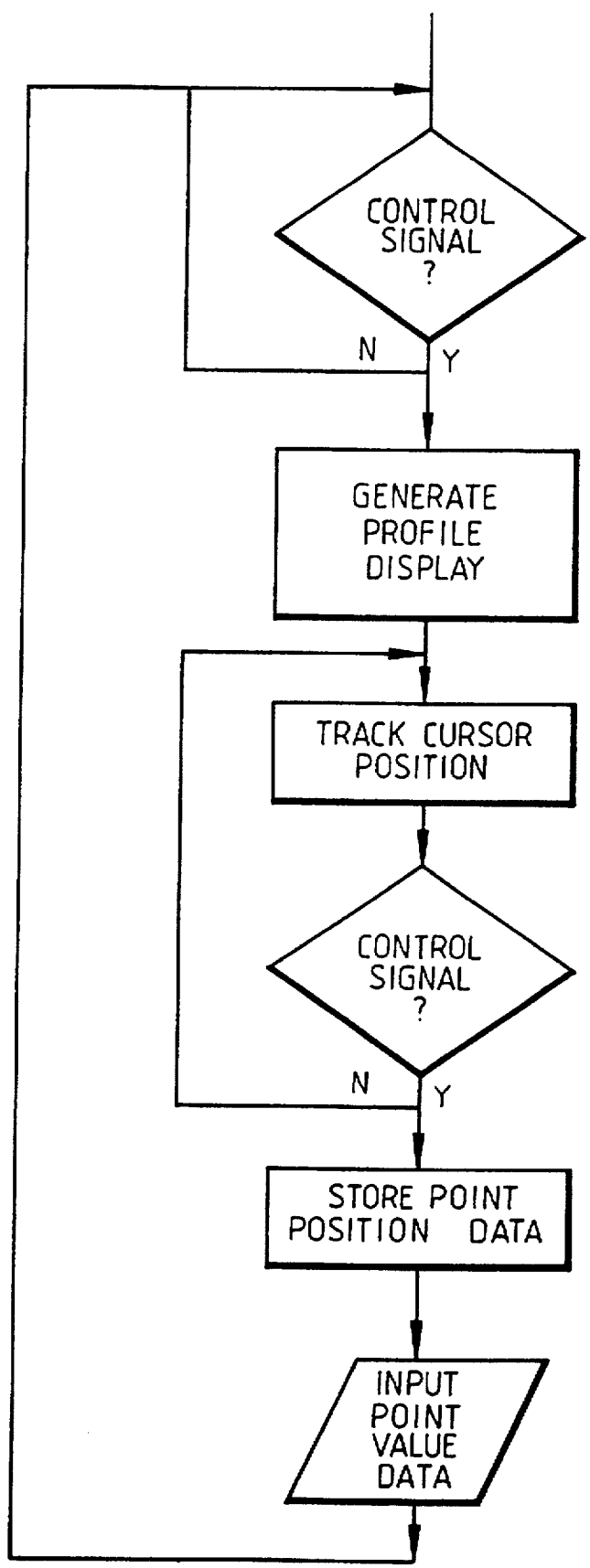

Referring to FIGS. 15 and 16, an alternative and preferred method of inputting opacity data is illustrated. When the user generates a control signal indicating a desire to input opacity data, a profile generating means 118 (comprising, conveniently, the CPU 100 acting under stored program control) causes the display 160 to display the contents of a profile display store 130c (as, for example, a display "window" overlying the supervisory display). The contents of the profile display store 130c comprise image data defining horizontal and vertical axes. The display represents the profile of opacity across the brush, corresponding to a cross-section along the line A. The horizontal axis represents the position across the line A between the two lateral extents $e_1, e_2$. The vertical line represents opacity. Both axes are conveniently scaled between 0 and 1.

The cursor position controller 112 is arranged to write data into the profile display store 130c to cause the display of a cursor symbol D at a position therein defined by movements of the position sensitive input device 170b. By positioning the cursor symbol at a point between the axes, and generating a control signal, the user signals an opacity value at a given distance across the object a transverse to the line A. The corresponding position between the extents $e_1, e_2$ and opacity value thereat are derived by the profile generator 118 from the current cursor position supplied by the cursor tracker 112 and are written into the attribute data held within the line data store 122. The profile generator 118 likewise causes the generation, at the current cursor position, of a point symbol. The cursor may then be repositioned, but the point symbol remains. When two or more different point symbols are displayed and, correspondingly, two or more opacity data values and positions are stored within the line table 122, the profile generator 118 preferably calculates by interpolation, the coordinates of image data within the profile display store corresponding to intervening points along an interpolated line between the points for which opacity data is stored, and sets the value of those image points within the profile display store 130c, so that when displayed on the display device 160, they represent the profile which would be followed. Generating a schematic cross-section display of this type is found to be of assistance to a user in visualising the transparency of, for example, an object corresponding to an airbrush stroke. The interpolation performed by the profile generator 118 is preferably the same as that which will be performed by the image generator 114.

To permit discontinuities in the colour or opacity across the extent of the object to be defined, preferably, the line table 122 is dimensioned to allow storage of two attribute values for each such lateral position; as shown in FIG. 12, one value is used to perform interpolation to one neighbouring point and the other to the other neighbouring point.

A corresponding profile display could be provided to allow the input and amendment of other attributes; for instance, brightness (of a monochrome object) or colour (of a coloured object).

Preferably, predefined attribute data specifying colour profiles and opacity profiles are also stored on the mass storage device 180 corresponding, for example, to particular paintbrushes or airbrushes, or to particular previously defined objects. Rather than manually enter and edit the attribute control data, the user may enter an appropriate command (via the keyboard 170b) to read such predetermined data from the mass storage device 180 into the line data table 122.

Preferably, the data stored for each attribute control point can specify all, or only a subset of the available attributes; for instance, it may be used to specify only colour or opacity. Thus, the variations across the object a of these attributes may be separately controlled, and independently edited. In such a case, the default predetermined value assigned to each attribute is a flag indicating that the attribute is not set.

Referring to FIG. 12, additional sectional lines S4 and S5 are generated, again in the form of Bezier curves. However, the points at which the sectional lines S4 and S5 intersect with boundary lines B1 and B2 are not control points, in that they do not define the shapes of B1 and B2. Such attribute points a1 a2 are selected from the menu and positionally located by means of the mouse, as previously described.

Before section line S4 is created, it would be common for attributes to have been set for sectional lines S1 and S3. After S4 is created, attributes of colour and transparency are generated for sectional line S4 by interpolating values between sectional lines S1 and S3. Thereafter, the colour and transparency of values set along line S4 may be modified by the operator.

Figure 13:
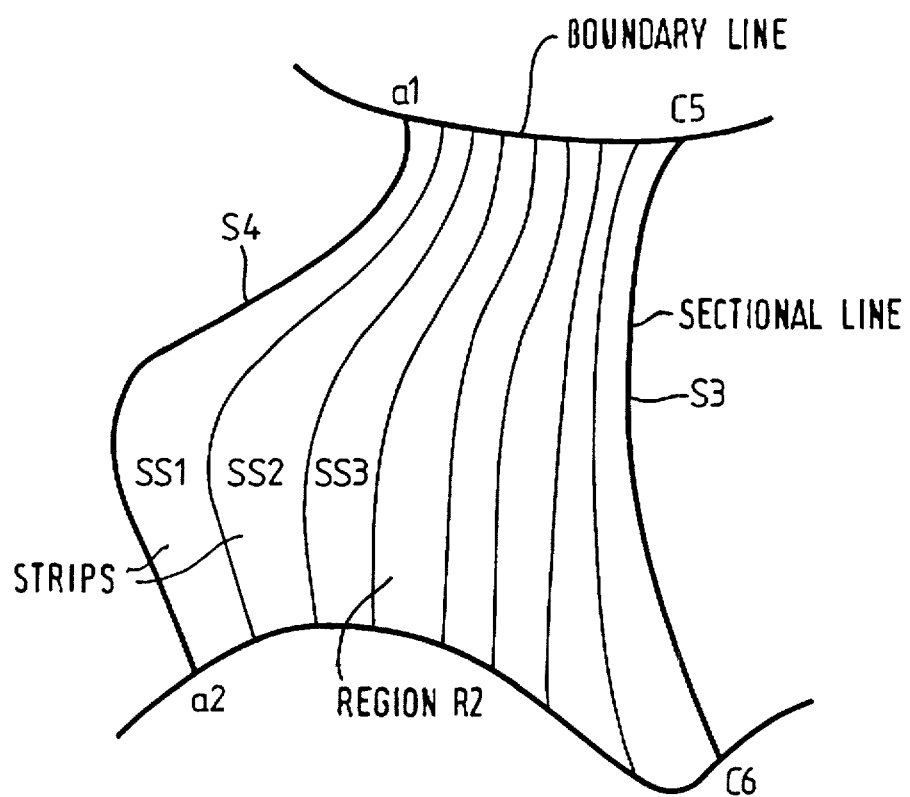
FIG. 13 details one of the regions shown in FIG. 12, including a plurality of strips.

Once a stroke of the type shown in FIG. 12 has been defined, the second stage may be initiated in order to render the stroke into a full colour image stored in the image store 130a of FIG. 4. Sectional lines S1, S4, S3, S5 and S2 define regions R1, R2, R3 and R4. In order to render the image, the first step is to determine the colour and opacity profile for each of these regions. Each region between each pair of adjacent sectional lines can be rendered independently and region R2 is detailed in FIG. 13.

The region R2 is divided into a plurality of strips SS1, SS2, SS3 etc between sectional lines S4 and S3. The strips SS1 etc are defined by forming additional sectional lines, generated by interpolating sectional lines S4 and S3.

The additional sectional lines are interpolated by transforming sectional lines S4 and S3 so that their end points are at, for example, (0,0)and (0,1) in Cartesian space.

The curve is translated so that its first end point lies at the origin. The translated curve is then rotated about the origin so that its other end point lies along the y axis. The curve is then scaled to bring the other end point to coordinate (0,1).

It is possible that interpolation will occur between two curves having a different number of control points. A process for performing such an operation is described in "automatic curve fitting with quadratic b-spline functions and its applications to computer-assisted animation", Yang et-al computer vision, computer graphics and image processing 33, pages 346 to 363.

The end points of the sectional lines are determined by interpolating along the boundary lines b1 and b2.

The interval between successive interpolated sectional lines must be small enough so that, when corresponding points are joined by straight lines, the maximum distance between the straight line approximation and the true path at that point is less than one pixel width in image space or, if the generated image is anti-aliased, to a definition of less than half a pixel width.

Figure 14:
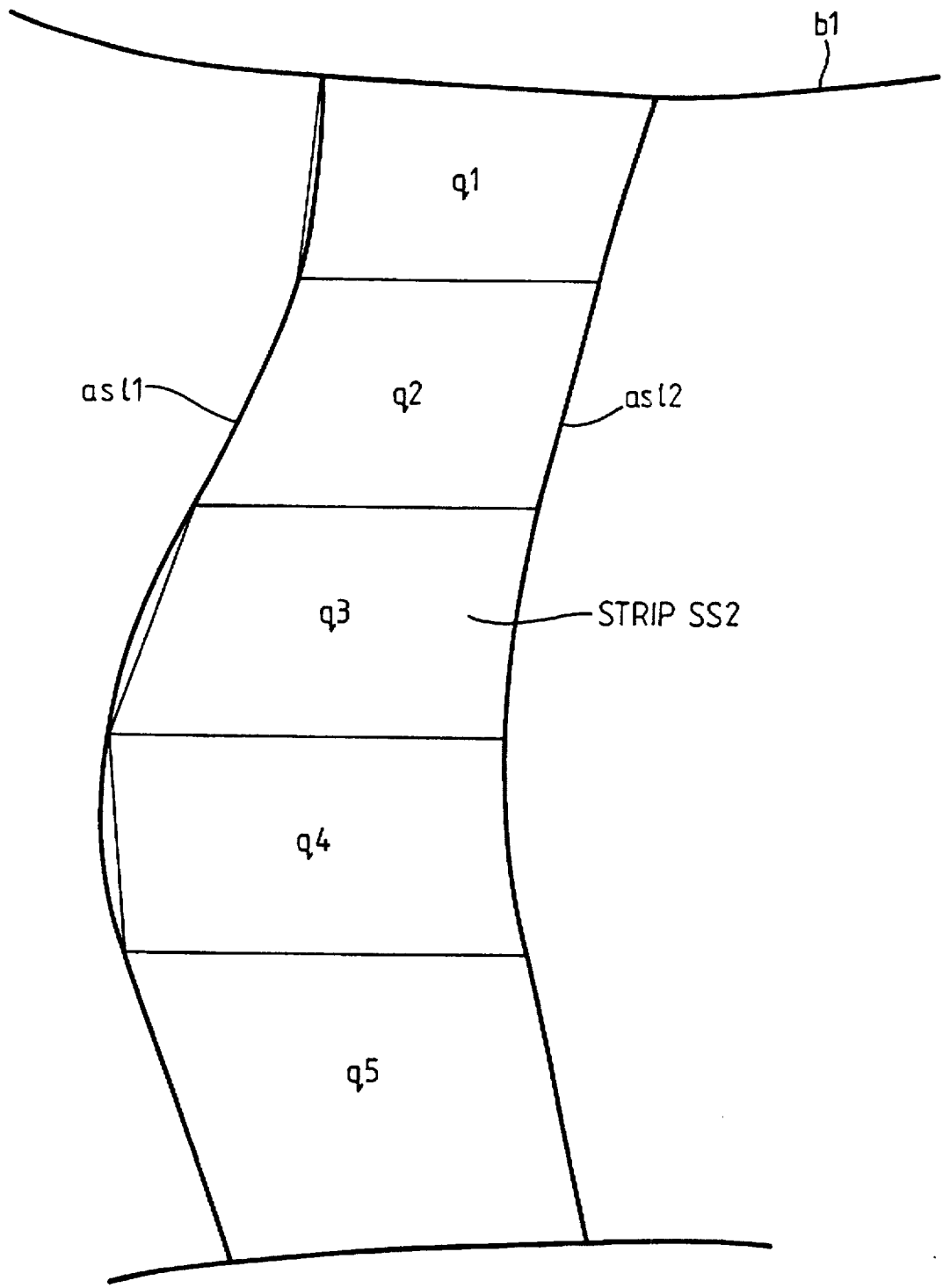
FIG. 14 details one of the strips shown in FIG. 13.

Strip SS2 is shown in greater detail in FIG. 14. The strip SS2 is defined by two additional sectional lines as11 and as12. Additional lines ASL1 and ASL2 have no opacity and colour profiles, these parameters being generated by interpolating the values stored for sectional lines S4 and S3.

The strip is now divided into quadrilaterals q1, q2, q3, q4, and q5 as shown in FIG. 14. The colour and opacity of each corner of each quadrilateral is determined, from which colour and opacity values for each pixel within a quadrilateral may be calculated by linearly interpolating these values.

The strip is divided into quadrilaterals by placing notional control points along lines as11 and as12. Such control points are positioned at places where colours are defined and then additional points are identified, such that adjacent points may be connected by a straight line, without crossing pixel boundaries. Thus, a quadrilateral may be formed if its edges do not cross a pixel boundary.

When rendering in anti-aliased form, smaller quadrilaterals are formed, such that, for example, straight lines defining quadrilaterals may be drawn to a definition of one eighth of the pixel spacing.

Pixels falling at the boundary of a quadrilateral are rendered separately, so that contributions from both quadrilateral regions may be combined before the image is placed against a background.

The attribute data could be arranged to store attributes other than colour and opacity. Thus, it will be possible to allow an image to be mapped onto the stroke by taking the interpolants, along and across the stroke for transfering data from another image.

Although in a preferred embodiment linear interpolation is performed, other forms of interpolation, such as Hermite interpolation could be performed if required.

We claim:

1. An image processing apparatus for generating output image data representing two-dimensional graphic objects, the apparatus comprising:

a receiver for receiving object data defining (i) first and second two-dimensional boundary lines of an object, each boundary line having a shape, (ii) a sectional line extending between said first and second boundary lines, the sectional line having a shape, and (iii) first and second connection points where the sectional line meets the first and second boundary lines respectively, such that each said connection point has a position which is defined relative to the shape of the respective boundary line, without itself contributing to defining that shape; and a renderer for processing the object data to generate an array of pixel values as said output image data, such that the values of pixels representing the object within a region bounded by the sectional line and by the first and second boundary lines depend upon the shape of the sectional line.

2. An image processing apparatus according to claim 1, wherein said sectional line is a first sectional line, wherein the object data further defines a second sectional line extending between said first and second boundary lines and having a shape different to that of the first sectional line, such that said region is bounded by said first and second sectional lines and said first and second boundary lines, and wherein the renderer generates the pixel values within said region so as to depend upon the shape of the first sectional line and the shape of the second sectional line.

3. An image processing apparatus according to claim 2, wherein said renderer includes an interpolator for generating a plurality of interpolated sectional lines so as to sub-divide said region into a plurality of strips, each interpolated sectional line having a shape interpolated between the shape of the first sectional line and the shape of the second sectional line.

4. An image processing apparatus according to claim 1, wherein said object data further defines a value of a visual attribute of the object along said sectional line, and wherein said renderer generates said pixel values so as to further depend upon said value of the visual attribute.

5. An image processing apparatus according to claim 4, wherein said visual attribute is one of: color and opacity.

6. An image processing apparatus according to claim 2, wherein said object data further defines a first value of a visual attribute along said first sectional line and a second value of said visual attribute along said second sectional line, and wherein said renderer generates said pixel values so as to further depend upon visual attribute values interpolated between said first value and said second value.

7. An image processing apparatus according to claim 1, wherein said object data defines the shape of said sectional line as a spline curve by reference to a plurality of geometric control points.

8. A method of operating an image processing apparatus to generate output image data representing two-dimensional graphic objects, the method comprising the steps of:

receiving object data defining (i) first and second two-dimensional boundary lines of an object, each boundary line having a shape, (ii) a sectional line extending between said first and second boundary lines, the sectional line having a shape, and (iii) first and second connection points where the sectional line meets the first and second boundary lines respectively, such that each said connection point has a position which is defined relative to the shape of the respective boundary line, without itself contributing to defining that shape; and processing the object data to generate an array of pixel values as said output image data, such that the values of pixels representing the object within a region bounded by the sectional line and by the first and second boundary lines depend upon the shape of the sectional line.

9. A method according to claim 8, wherein said sectional line is a first sectional line, wherein the object data further defines a second sectional line extending between said first and second boundary lines and having a shape different to that of the first sectional line, such that said region is bounded by said first and second sectional lines and said first and second boundary lines, and wherein the pixel values within said region are generated so as to depend upon the shape of the second sectional line.

10. A method according to claim 9, wherein said step of processing the object data to generate an array of pixel values includes generating a plurality of interpolated sectional lines so as to sub-divide said region into a plurality of strips, each interpolated sectional line having a shape interpolated between the shape of the first sectional line and the shape of the second sectional line.

11. A method according to claim 8, wherein said object data further defines a value of a visual attribute of the object along said sectional line, and wherein said pixel values are generated so as to further depend upon said value of the visual attribute.

12. A method according to claim 11, wherein said visual attribute is one of: color and opacity.

13. A method according to claim 9, wherein said object data further defines a first value of a visual attribute along said first sectional line and a second value of said visual attribute along said second sectional line, and wherein said pixel values are generated so as to further depend upon visual attribute values interpolated between said first value and said second value.

14. A method according to claim 8, wherein said object data defines the shape of said sectional line as a spline curve, by reference to a plurality of geometric control points.

15. A method according to claim 8, further comprising the step of generating a signal conveying said output image data.

16. A method according to claim 15, further comprising the step of recording the signal.

17. A method according to claim 8, further comprising the step of generating a display of said graphic objects from said output image data.

18. A computer-useable medium having computer-readable instructions stored therein for causing a processor in an image processing apparatus to generate output image data representing two-dimensional graphic objects, the instructions comprising instructions for causing the processor to process object data defining (i) first and second two-dimensional boundary lines of an object, each boundary line having a shape, (ii) a sectional line extending between said first and second boundary lines, said sectional line having a shape, and (iii) first and second connection points where the sectional line meets the first and second boundary lines respectively, such that each said connection point has a position which is defined relative to the shape of a respective boundary line, without itself contributing to defining that shape, to generate an array of pixel values as said output image data, such that the values of pixels representing the object within a region bounded by the sectional line and by the first and second boundary lines depend on the shape of the sectional line.

19. A computer-useable medium according to claim 18, wherein said sectional line is a first sectional line, wherein the object data further defines a second sectional line extending between said first and second boundary lines and having a shape different to that of the first sectional line, such that said region is bounded by said first and second sectional lines and said first and second boundary lines, and wherein the instructions comprise instructions for causing the processor to generate pixel values within said region which depend upon the shape of the first sectional line and the shape of the second sectional line.

20. A computer-useable medium according to claim 19, wherein said instructions comprise instructions for causing said processor to generate a plurality of interpolated sectional lines so as to sub-divide said region into a plurality of strips, each interpolated sectional line having a shape interpolated between the shape of the first sectional line and the shape of the second sectional line.

21. A computer-useable medium according to claim 18, wherein said object data further defines a value of a visual attribute of the object along said sectional line, and wherein said instructions further comprise instructions for causing said processor to generate said pixel values so as to further depend upon said value of the visual attribute.

22. A computer-useable medium according to claim 19, wherein said object data further defines a first value of a visual attribute along said first sectional line and a second value of said visual attribute along said second sectional line, and wherein said instructions include further instructions for causing said processor to generate said pixel values so as to further depend upon visual attribute values interpolated between said first value and said second value.

* * * * *

UNITED STATES PATENT AND TRADEMARK OFFICE
CERTIFICATE OF CORRECTION

PATENT NO. : 5,754,183
DATED : May 19, 1998
INVENTOR(S) : Berend et al.

It is certified that error appears in the above-identified patent and that said Letters Patent is hereby corrected as shown below:

Column 1, line 18, "application" should read --Applications--.

Column 11, line 46, "hand the" should read --hand, the--.

Column 17, line 3, "ASL1 and ASL2" should read --asl1 and asl2--.

Column 18, line 51, "shape of" should read --shape of the first sectional line and the shape of--.

Signed and Sealed this

Fifteenth Day of September, 1998

*Attest:*

BRUCE LEHMAN

*Attesting Officer*  *Commissioner of Patents and Trademarks*